United States Patent [19]

Watson et al.

[11] 4,269,681
[45] May 26, 1981

[54] RADIAL FLOW ELECTROFILTER

[75] Inventors: Frederick D. Watson; Weldon D. Mayse; Albert D. Franse, all of Houston, Tex.

[73] Assignee: Petrolite Corporation, St. Louis, Mo.

[21] Appl. No.: 85,448

[22] Filed: Oct. 16, 1979

[51] Int. Cl.³ .............................................. B03C 5/00
[52] U.S. Cl. .................................... 204/188; 204/302
[58] Field of Search ................................ 204/302–308, 204/186, 188

[56] References Cited

U.S. PATENT DOCUMENTS

| 2,573,967 | 11/1951 | Hamlin | 204/184 |
|---|---|---|---|
| 3,252,885 | 5/1966 | Griswold | 204/302 |
| 3,394,067 | 7/1968 | Shirley | 204/180 |
| 3,567,619 | 3/1971 | Brown | 204/302 |
| 3,799,856 | 3/1974 | Franse | 204/188 |
| 3,799,857 | 3/1974 | Franse | 204/188 |
| 3,891,528 | 6/1975 | Griswold | 204/186 |
| 3,928,158 | 12/1975 | Fritsche | 204/188 |
| 3,980,541 | 9/1976 | Aine | 204/186 |
| 4,040,926 | 8/1977 | Oberton | 204/186 |
| 4,059,498 | 11/1977 | Crissman | 204/188 |

Primary Examiner—T. M. Tufariello
Attorney, Agent, or Firm—Sidney B. Ring; Hyman F. Glass

[57] ABSTRACT

A radial flow electrofilter having a vertical cylindrical fluid distributor means adapted to serve as a grounded electrode, a vertical central tubular collector also adapted to serve as an electrode and at least one, preferably a plural odd number, of permeable cylindrical electrodes concentrically positioned between the distributor and the collector. The filter medium preferably consists of non-deformable particles, the filter being provided with backflushing means. In operation, finely divided solids, contained in a liquid of low conductivity, may be efficiently removed by passing the liquid radially through the filter, while subjected to a unidirectional current electric field, from the periphery of the filter toward its center.

13 Claims, 2 Drawing Figures

RADIAL FLOW ELECTROFILTER

FIELD OF THE INVENTION

This invention relates to electrofiltration apparatus and to a process for electrofiltration employing such apparatus.

BACKGROUND OF THE INVENTION

It is known to remove solids from hydrocarbon and other organic liquids by the use of electrofilters. The electrofilter is a device having a filter bed of a porous medium in which an electric field is maintained by one or more energized electrodes. The electric field is of high intensity so that the solids are removed from the liquid stream by becoming tenaciously attached to the surfaces of the porous medium. Such porous medium may be, for example, a polyurethane foam or may be composed of hard granular particles.

Among the electrofilters of this general type, mention may be made of those shown in U.S. Pat. Nos. 3,799,856 to Franse, 3,891,528 to Griswold, 3,928,158 to Fritsche, 4,059,498 to Crissman et al and 4,040,926 to Oberton.

It is an object of this invention to provide improved electrofiltration apparatus.

It is a further object of this invention to provide an efficient electrofiltration process.

Other objects of the invention will become apparent from the following description.

SUMMARY OF THE INVENTION

In accordance with this invention, there is provided an improved electrofilter for use in the removal of finely divided solids from liquids of low electrical conductivity. The electrofilter comprises a vertical cylindrical metallic vessel; a metallic cylindrical fluid distributor within the vessel, concentric with and spaced a small distance apart from the vessel wall, thereby providing an annular space between the distributor and the vessel wall, the distributor being adapted to serve as an electrode at ground potential; a fluid inlet in the side of the vessel fluidly communicating with the annular space; a metallic permeable central tubular outlet collector extending vertically through at least a portion of the porous bed and adapted to serve as an electrode; a fluid outlet fluidly connected to the outlet collector and extending outside of the vessel; at least one permeable cylindrical electrode extending vertically through at least a portion of the bed and concentrically positioned between the distributor and the outlet collector; and conductor means for supplying potential to at least alternately spaced electrodes to provide electric fields between adjacent electrodes.

In the main embodiment contemplated, the electrofilter of this invention includes also backflushing means, which may include a backflush inlet, a backflush fluid distributor in the bottom portion of the vessel fluidly communicating with the backflush inlet and a backflush fluid outlet in the upper portion of the vessel. A plural odd number of permeable cylindrical electrodes are preferably employed, in which case means are provided for electrically grounding the outlet collector and the alternately spaced electrodes between the outlet collector and the cylindrical fluid distributor.

Non-deformable particles such as glass or porcelain beads or particles of a silicon dioxide containing mineral, such as those disclosed in the above referred to Oberton patent, are preferred as the dielectric filtering medium in this embodiment, although non-conductive deformable material having voids, such as open-pore polyurethane foam or nylon mesh wrapped in layers or nylon cord wrapped to create voids, may also be employed.

A further aspect of the invention relates to a process for the electrofiltration of a liquid of low electrical conductivity containing finely divided solids, comprising passing the liquid in a radial direction through a cylindrical porous bed of a dielectric filtering medium, the bed being disposed interiorly of a cylindrical distributor maintained at ground potential and exteriorly of a central tubular collector, and being traversed for a major portion of its length by at least one permeable cylindrical electrode concentrically positioned between the distributor and the collector, which also serves as an electrode. A unidirectional current electric field is maintained between adjacent electrodes, between the distributor and the electrode adjacent thereto and between the collector and the electrode adjacent thereto. The electric field is discontinued when the bed becomes loaded with finely divided solids to the extent that filtering effectiveness becomes impaired and the solids are removed from the bed by backflushing it with a backflush liquid.

The preferred direction of flow of the liquid being filtered is from the outer periphery of the bed toward its center. The bed preferably consists of non-deformable particles such as glass or porcelain beads or particles of a silicon dioxide containing material.

The unidirectional current electric field utilized is preferably a continuous direct current field, preferably provided by a voltage gradient between 1 and 60 KV per inch, with the electrodes spaced from 1 to 5 inches apart. It is preferred to employ an odd number of electrodes, with the central collector and the alternate electrodes between the collector and the distributor being at ground potential and the remaining electrodes energized. Most preferably, a plural odd number of electrodes between the collector and distributor are employed. The use of multiple electrodes allows close spaced treating gaps in larger vessels. Larger vessels are less expensive for large streams than a multiple of smaller units.

The radial flow of the liquid being treated from the outer perimeter of the filter medium to its center, as described above, has the advantage of having the dirty oil at the outer perimeter where the radial flow is the slowest, as opposed to the center, where the flow rate is the greatest. As the rate increases with flow to the center collector, cleaner oil is being further cleaned. Radial flow in the reverse direction, i.e., from the center outward, has the disadvantage that the dirtiest oil is treated at the highest rate of flow.

It will be seen, however, that regardless of the direction of the flow, the apparatus involved may in some cases be the same. In such cases (e.g., the embodiment shown in FIGS. 1 and 2, described below), although the apparatus is described in the specification and claims employing terminology which assumes flow from the outside to the center, the apparatus would still be the same and within the intended scope of the claims if the flow were in the other direction. Similarly, although the terminology in this specification assumes operation of the apparatus in a vertical position, the apparatus can be employed in other than a vertical position since its operation is not gravity dependent.

DESCRIPTION OF THE PREFERRED EMBODIMENT

The invention is illustrated by but not limited to the exemplary embodiments described below.

Referring to the drawings.

Figure 1:
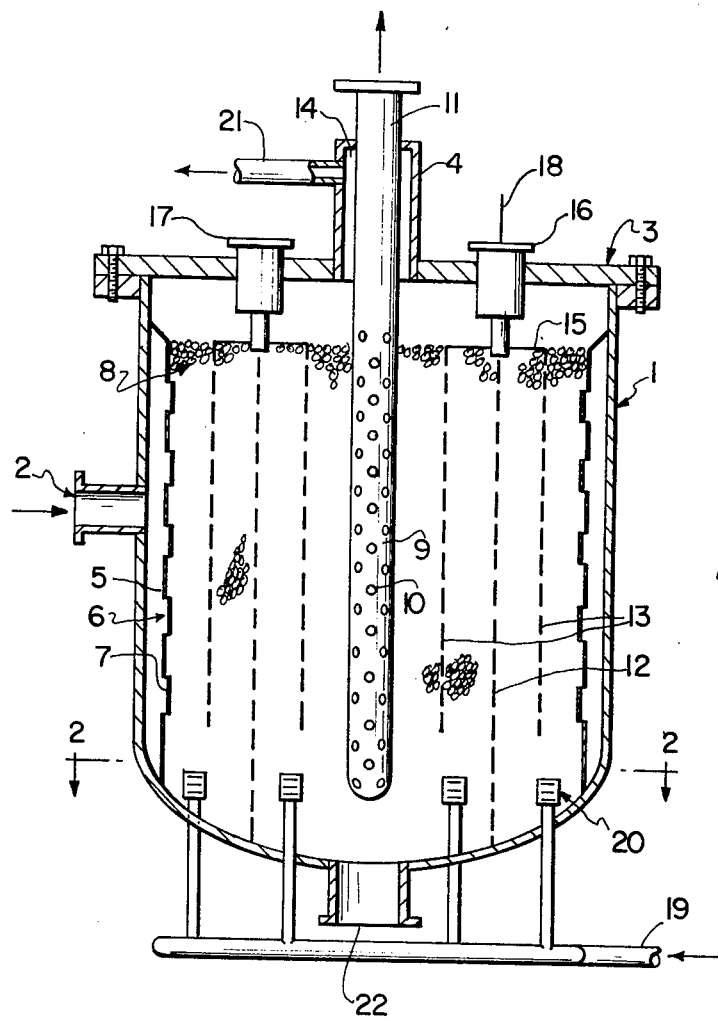
FIG. 1 is a longitudinal vertical cross-section of an electrofilter of this invention incorporating backflushing means.
Figure 2:
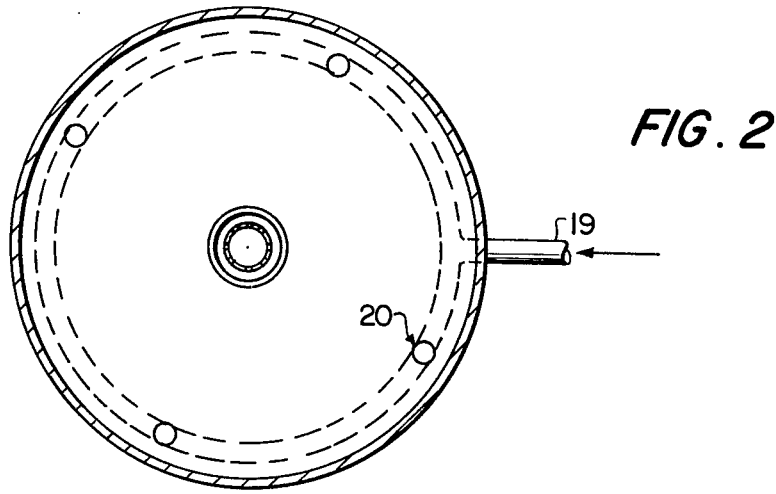
FIG. 2 is a transverse horizontal cross-section taken along line 2-2 of the electrofilter shown in FIG. 1.

FIGS. 1 and 2 show an electrofilter of this invention. This filter includes a generally cylindrical metallic electrofilter vessel 1 having a fluid feed inlet 2 in the sidewall and provided with a metallic cover 3 having a centrally positioned vertical neck portion 4. Inside the vessel 1, concentric with and spaced a small distance apart from the vessel walls, is a metallic cylindrical distributor liner 5, having meter orifices 6, which may be covered by screens or slotted covers 7. Distributor liner 5 is fastened at its top and bottom to the wall of vessel 1. Interiorly of the distributor liner 5 is a porous bed of a dielectric filtering medium 8, suitably glass or porcelain beads, although other types of non-deformable dielectric particles may be employed, including silicon dioxide containing minerals such as those disclosed in Oberton U.S. Pat. No. 4,040,926. The screens or slotted covers 7 serve to keep these particles from plugging the orifices 6. Less preferred as filtering media are open-pore polyurethane foam and other non-conductive deformable materials having voids, such as nylon wrapped in layers or nylon cord wrapped to create voids. A metallic tubular collector 9, having meter orifices 10, is centrally positioned within vessel 1 and extends most of the height of the vessel. A tubular extension 11 of the collector 9, lacking the orifices, extends through the vessel cover 3 and serves as the product outlet. As shown in the drawing, a plurality of concentric electrodes 12 and 13, concentric with the collector 9, extend vertically through the porous bed 8 for most of its height. The electrodes 12 and 13 are permeable, being formed of expanded metal or other open material, such as sheet metal punched with holes or slotted metal. As shown in FIG. 1, there are an odd number of electrodes, of which electrodes 12 are at ground potential, and electrodes 13, alternating with electrodes 12, are energized. In addition to electrodes 12, the distributor liner 5 and the collector 9 also constitute ground potential electrodes. As shown, electrodes 12 are attached mechanically and electrially to the bottom of vessel 1. The distributor liner 5 is similarly attached to upper and lower parts of the vessel sidewall and outlet collector 9 is in electrical communication with vessel 1 by way of the neck portion 4 of cover 3. An annular space 14 exists between outlet collector 8 and the sidewall of neck portion 4. Energized electrodes 13 are connected together in parallel by a conductor 15 and supported as a unit from entrance bushing 16 and insulator support 17. The attachment at entrance bushing 16 also serves as the source of electrical potential to the electrodes 13, the entrance bushing serving as the conduit for high voltage D.C. power supplied by the wire or electrical conduit 18 from a source not shown.

Although the drawing shows two energized electrodes 13 spaced between grounded members 5, 12 and 9, as few as one energized electrode spaced between two grounded members is sufficient. Where the outermost and innermost electrodes are grounded as shown (e.g., distributor liner 5 and outlet collector 9), an odd number of electrodes is thus present.

It is also possible, although not preferred, to make the outlet collector 9 function as an energized electrode, in which case there will be an even number of electrodes. It is further possible, although also not preferred, to employ two separately energized electrode systems. In every case, however, the vessel has to be at ground potential for safety.

A fluid inlet header 19 for backflushing purposes extends through the bottom of vessel 1 and communicates fluidly with fluid distributor outlets 20. These outlets are preferably slotted to prevent the particles of the filter medium from plugging them. Suitable for this purpose are Johnson Well Screens ®. Annular space 14 serves as an outlet annulus for the backflush fluid, being provided with an outlet conduit 21. A pump out drain 22 is provided in the bottom portion of vessel 1.

In operation, a raw liquid feed containing finely divided solid particles is introduced into vessel 1 through feed inlet 2 and passes through the orifices 6 of the distributor 5 and then in a generally radial direction through the filter medium 8 and the permeable electrodes 12 and 13 to the outlet collector 9. During its passage through the medium 8, the feed is subjected to the action of an electric field between adjacent electrodes, the result of which is that the finely divided particles separate from the feed and are retained in the medium.

The product of this operation passes through the orifices 10 of the collector 9 and upwardly through the collector and its tubular extension 11, which serves as the product outlet conduit.

When the filter medium 8 becomes loaded with the separated solids to the extent that the efficiency of the filter is impaired, the filter bed is backflushed with a suitable flushing fluid such as a raw feed stream or other stream which can be recycled back into processing or otherwise disposed of while containing the contaminant. This fluid is introduced through backflush inlet header 19 and distributor outlets 20 and passes upwardly through the filter medium 8 into the annular space 14, from which it exits by means of backflush outlet conduit 21.

The spacing between the electrodes and the voltage employed are interrelated. In general, these are set so that a voltage gradient in the range of 1 KV to 60 KV per inch is achieved, the latter figure being about the limit for commercial power supplies. It is possible to design and use equipment with higher potentials, but after 75 KV, these are costly. The potential gradient chosen will depend on the nature of the solids in the feed. The electrodes are ordinarily spaced from 1" to 5" apart, as required to achieve the desired potential gradient, taking into consideration the power supply capability.

It will be evident that the forgoing description is illustrative of, rather than limitative upon, the invention as defined by the appended claims and that various changes and modifications can be made in the apparatus and methods exemplified without departing from the spirit of the invention.

We claim:

1. A radial flow electrofilter for removal of finely divided solid particles from liquids of low electrical conductivity comprising:

(a) a vertical cylindrical metallic vessel;

(b) metallic cylindrical fluid distributor means within said vessel, concentric with and spaced a small distance apart from the vessel wall, thereby providing an annular space between said distributor means and said vessel wall; said distributor means being adapted to serve as an electrode at ground potential;

(c) fluid inlet means in the side of said vessel, fluidly communicating with said annular space;

(d) a porous bed of a dielectric filtering medium disposed interiorly of said cylindrical distributor means;

(e) a metallic permeable central tubular outlet collector extending vertically through at least a portion of said porous bed; said outlet collector being adapted to serve as an electrode;

(f) fluid outlet means fluidly connected to said central tubular outlet collector and extending outside of said vessel;

(g) at least one permeable cylindrical electrode extending vertically through at least a portion of said porous bed and concentrically positioned intermediate said cylindrical distributor means and said outlet collector; and (h) conductor means for supplying potential to at least alternately spaced said electrodes to provide electric fields between adjacent electrodes.

2. An electrofilter of claim 1 wherein said porous bed of a dielectric filtering medium consists of nondeformable particles and comprising also:

(i) backflush inlet means;

(j) backflush fluid distributor means in the bottom portion of said vessel fluidly communicating with said backflush inlet means; and (k) backflush fluid outlet means in the upper portion of said vessel.

3. An electrofilter of claim 1 wherein a plural odd number of said intermediate permeable cylindrical electrodes, connected in parallel by said conductor means (h), are employed, comprising also means for electrically grounding said outlet collector and the alternately spaced intermediate electrodes.

4. The electrofilter of claim 2 wherein said non-deformable particles are glass or porcelain beads or particles of a silicon dioxide containing mineral.

5. The electrofilter of claim 3 wherein said porous bed of a dielectric filtering medium consists of a non-conductive deformable material having voids.

6. The electrofilter of claim 5 wherein said non-conductive deformable material is an open-pore polyurethane foam.

7. A process for the electrofiltration of a liquid of low electrical conductivity containing finely divided solids comprising passing said liquid in a radial direction through a cylindrical porous bed of a dielectric filtering medium, said bed being disposed interiorly of a cylindrical distributor means maintained at ground potential and exteriorly of a central tubular collector means, and being traversed vertically for a major portion of its length by at least one permeable cylindrical electrode concentrically postioned between said distributor means and said collector means, said collector means also serving as an electrode, a unidirectional current electric field being maintained between adjacent electrodes, between said distributor means and the electrode adjacent thereto and between said collector means and the electrode adjacent thereto, discontinuing said electric fields when said bed becomes loaded with finely divided solids to the extent that filtering effectiveness becomes impaired; and removing said finely divided solids from said bed by backflushing it with a backflush liquid.

8. The process of claim 7 wherein the direction of flow of said non-conductive liquid containing finely divided solid particles is from the outer periphery of said bed toward its center.

9. The process of claim 8 wherein said bed consists of non-deformable particles.

10. The process of claim 9 wherein said non-deformable particles are glass or porcelain beads or particles of a silicon dioxide containing mineral.

11. The process of claim 8 wherein said unidirectional current electric field is a continuous direct current field.

12. The process of claim 11 wherein a voltage gradient between 1 and 60 KV per inch is employed and the electrodes are spaced from 1 to 5 inches apart.

13. The process of claim 12 wherein an odd number of electrodes are employed, said central collector and the alternate electrodes between said collector and said distributor are at ground potential, and the remaining electrodes are energized.

* * * * *